(12) United States Patent
Maresh et al.

(10) Patent No.: US 11,409,856 B2
(45) Date of Patent: Aug. 9, 2022

(54) VIDEO-BASED AUTHENTICATION

(71) Applicant: International Business Machines Corporation, Armonk, NY (US)

(72) Inventors: Mark Maresh, Wake, NC (US); Colm Nolan, Navan (IE); Juan F. Vargas, Cary, NC (US); Michael J. Whitney, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 760 days.

(21) Appl. No.: 16/369,863

(22) Filed: Mar. 29, 2019

(65) Prior Publication Data

US 2020/0311244 A1     Oct. 1, 2020

(51) Int. Cl.
    *G06F 21/36*     (2013.01)
    *G06V 20/40*     (2022.01)
    *G06V 20/64*     (2022.01)
    *G06F 21/31*     (2013.01)

(52) U.S. Cl.
    CPC .............. *G06F 21/36* (2013.01); *G06F 21/31* (2013.01); *G06V 20/46* (2022.01); *G06V 20/64* (2022.01)

(58) Field of Classification Search
    CPC ................................ G06F 21/36; G06F 21/31
    See application file for complete search history.

(56) References Cited

U.S. PATENT DOCUMENTS 5,646,997 A     7/1997    Barton
5,870,471 A     2/1999    Wootton et al.
(Continued)

FOREIGN PATENT DOCUMENTS

WO     2015089324 A1     6/2015

OTHER PUBLICATIONS

Anonymous, "Authentication with an image or video of an object," An IP.com Prior Art Database Technical Disclosure, IP.com No. IPCOM000228146D, Jun. 10, 2013, 3 pgs.
(Continued)

*Primary Examiner* — James R Turchen
(74) *Attorney, Agent, or Firm* — Cantor Colburn LLP; Tihon Poltavets

(57) ABSTRACT

Methods, systems and computer program products for providing video-based authentication are provided. Aspects include receiving a master video comprising a recording of a first plurality of objects. Aspects also include identifying each of the first plurality of objects using image recognition techniques. Aspects also include receiving a user selection of a plurality of authentication objects, where the plurality of authentication objects are a subset of the first plurality of objects. Aspects also include receiving a user authentication request comprising an authentication video. The authentication video is a recording of a second plurality of objects. Aspects also include identifying each of the second plurality of objects using image recognition techniques. Aspects also include authenticating a user associated with the user authentication request in response to determining that identifications of a subset of objects of the second plurality of objects match identifications of the plurality of authentication objects.

20 Claims, 9 Drawing Sheets

| MASTER | Login #6 | Login #7 | Login #8 | Login #9 |
|---|---|---|---|---|
|  | Duplicate to #1 | Missing Object | Wrong Order | No Extra Objects |
| Ball | Ball | Ball | Hand | Ball |
| Mouse | Computer | Mouse | Mouse | Mouse |
| Pen | Mouse | Computer | Ball | Pen |
|  | Computer |  | Pen |  |
|  | Pen |  |  |  |
|  |  |  |  |  |

(56) References Cited

U.S. PATENT DOCUMENTS

| | | | |
|---|---|---|---|
| 8,239,924 B2* | 8/2012 | Ficko | G06F 21/34 |
| | | | 726/5 |
| 8,254,699 B1 | 8/2012 | Zhao et al. | |
| 8,621,560 B2 | 12/2013 | Sweeley et al. | |
| 8,881,256 B1* | 11/2014 | Roth | H04L 67/535 |
| | | | 705/55 |
| 8,984,622 B1 | 3/2015 | Baldwin et al. | |
| 9,219,720 B1 | 12/2015 | Satpathy et al. | |
| 9,548,865 B2* | 1/2017 | Hewitt | H04L 67/34 |
| 9,721,147 B1* | 8/2017 | Kapczynski | G06Q 50/265 |
| 10,049,202 B1* | 8/2018 | Johansson | G06F 3/0486 |
| 10,397,208 B2 | 8/2019 | Eramian | G06V 10/751 |
| 10,515,419 B1* | 12/2019 | Walker | G06V 20/63 |
| 11,042,625 B2* | 6/2021 | Bojan | G06F 21/32 |
| 2013/0145441 A1 | 6/2013 | Mujumdar et al. | |
| 2013/0176437 A1 | 7/2013 | Tseng | |
| 2016/0156472 A1* | 6/2016 | Hewitt | H04L 41/5067 |
| | | | 726/20 |
| 2017/0099140 A1* | 4/2017 | Hoy | H04L 9/3006 |
| 2017/0171177 A1* | 6/2017 | Eramian | H04L 63/107 |
| 2019/0332757 A1* | 10/2019 | Chen | G06V 40/20 |
| 2020/0057888 A1* | 2/2020 | Angelakos | G06V 10/44 |

OTHER PUBLICATIONS

Anonymous, "Multi-factor Authentication using Real-World Object Composition and Analysis," An IP.com Prior Art Database Technical Disclosure, IP.com No. IPCOM000238653D, Sep. 9, 2014, 6 pgs.

Maresh et al., "Location Validation for Authentication," U.S. Appl. No. 15/820,802, filed Nov. 22, 2017.

Ng et al., "Light-weight Method of 2-way Secured Authentication between NFC Tag and Reader," An IP.com Prior Art Database Technical Disclosure, IP.com No. IPCOM000241118D, Mar. 27, 2015, 5 pgs.

Oberoi, "Comparing the Top Five Computer Vision APIs," GOberoi. com; Jul. 11, 2016; URL: https://goberoi.com/comparing-the-top-five-computer-vision-apis-98e3e3d7c647; Retrieved on Mar. 27, 2019, 14 pages.

Upahdyay et al., "Video Authentication—An Overview," International Journal of Computer Science & Engineering Survey (IJCSES), vol. 2, No. 4, Nov. 2011, pp. 75-96.

* cited by examiner

| MASTER | Login #1 | Login #2 | Login #3 | Login #4 | Login #5 |
|---|---|---|---|---|---|
| | Accepted | Accepted | Accepted | Accepted | Accepted |
| Ball | Ball | Ball | Computer | Ball | Ball |
| Mouse | Computer | Hand | Ball | Mouse | Mouse |
| Pen | Mouse | Mouse | Mouse | Pen | Pen |
| | Computer | Hand | Hand | Hand | Ball |
| | Pen | Pen | Pen | Computer | Mouse |
| | | | | Hand | Pen |

FIG. 5E

| MASTER | Login #6 Duplicate to #1 | Login #7 Missing Object | Login #8 Wrong Order | Login #9 No Extra Objects |
|---|---|---|---|---|
| Ball | Ball | Ball | Hand | Ball |
| Mouse | Computer | Mouse | Mouse | Mouse |
| Pen | Mouse | Computer | Ball | Pen |
|  | Computer |  | Pen |  |
|  | Pen |  |  |  |

FIG. 5F

VIDEO-BASED AUTHENTICATION

BACKGROUND

The present invention generally relates to processing systems, and more specifically, to providing video-based authentication.

Processing systems can be used to access secure or protected data. In order to access the secure or protected data, a user may be required to authenticate itself in order to be granted access. For example, the user enters a username and password to gain access to a secure portion of a website. Basic username and password authentication is common and easy to implement but can also be less secure than other authentication techniques. Some websites, applications, data stores, etc., implement more advanced authentication techniques. For example, a financial institution, an online medical chart, etc., can require multiple levels of authentication (i.e., multi-factor authentication) for a user to access secure or protected data. Multi-factor authentication requires that a user present multiple separate pieces of evidence to gain access to secure or protected data.

SUMMARY

Embodiments of the present invention are directed to a computer-implemented method for providing video-based authentication. A non-limiting example of the computer-implemented method includes receiving a master video comprising a recording of a first plurality of objects. The method also includes identifying each of the first plurality of objects using image recognition techniques. The method also includes receiving a user selection of a plurality of authentication objects. The plurality of authentication objects are a subset of the first plurality of objects. The method also includes receiving a user authentication request comprising an authentication video. The authentication video includes a recording of a second plurality of objects. The method also includes identifying each of the second plurality of objects using image recognition techniques. Responsive to determining that identifications of a subset of objects of the second plurality of objects match identifications of the plurality of authentication objects, the method includes authenticating a user associated with the user authentication request.

Embodiments of the present invention are directed to a system for providing video-based authentication. The system includes a memory having computer readable computer instructions, and a processor for executing the computer readable instructions. The computer readable instructions include instructions for receiving a master video comprising a recording of a first plurality of objects. The computer readable instructions also include instructions for identifying each of the first plurality of objects using image recognition techniques. The computer readable instructions also include instructions for receiving a user selection of a plurality of authentication objects. The plurality of authentication objects are a subset of the first plurality of objects. The computer readable instructions also include instructions for receiving a user authentication request comprising an authentication video. The authentication video includes a recording of a second plurality of objects. The computer readable instructions also include instructions for identifying each of the second plurality of objects using image recognition techniques. Responsive to determining that identifications of a subset of the second plurality of objects match identifications of the plurality of authentication objects, the computer readable instructions include instructions for authenticating a user associated with the user authentication request.

Embodiments of the invention are directed to a computer program product for providing video-based authentication, the computer program product comprising a computer readable storage medium having program instructions embodied therewith. The computer readable storage medium is not a transitory signal per se. The program instructions are executable by a processor to cause the processor to perform a method. A non-limiting example of the method includes receiving a master video comprising a recording of a first plurality of objects. The method also includes identifying each of the first plurality of objects using image recognition techniques. The method also includes receiving a user selection of a plurality of authentication objects. The plurality of authentication objects are a subset of the first plurality of objects. The method also includes receiving a user authentication request comprising an authentication video. The authentication video includes a recording of a second plurality of objects. The method also includes identifying each of the second plurality of objects using image recognition techniques. Responsive to determining that identifications of a subset of objects of the second plurality of objects match identifications of the plurality of authentication objects, the method includes authenticating a user associated with the user authentication request.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 5E depicts an example table of objects derived from various authentication videos resulting in successful authentication according to one or more embodiments of the present invention;

FIG. 5F depicts an example table of objects derived from various authentication videos resulting in unsuccessful authentication according to one or more embodiments of the present invention;

Figure 1:
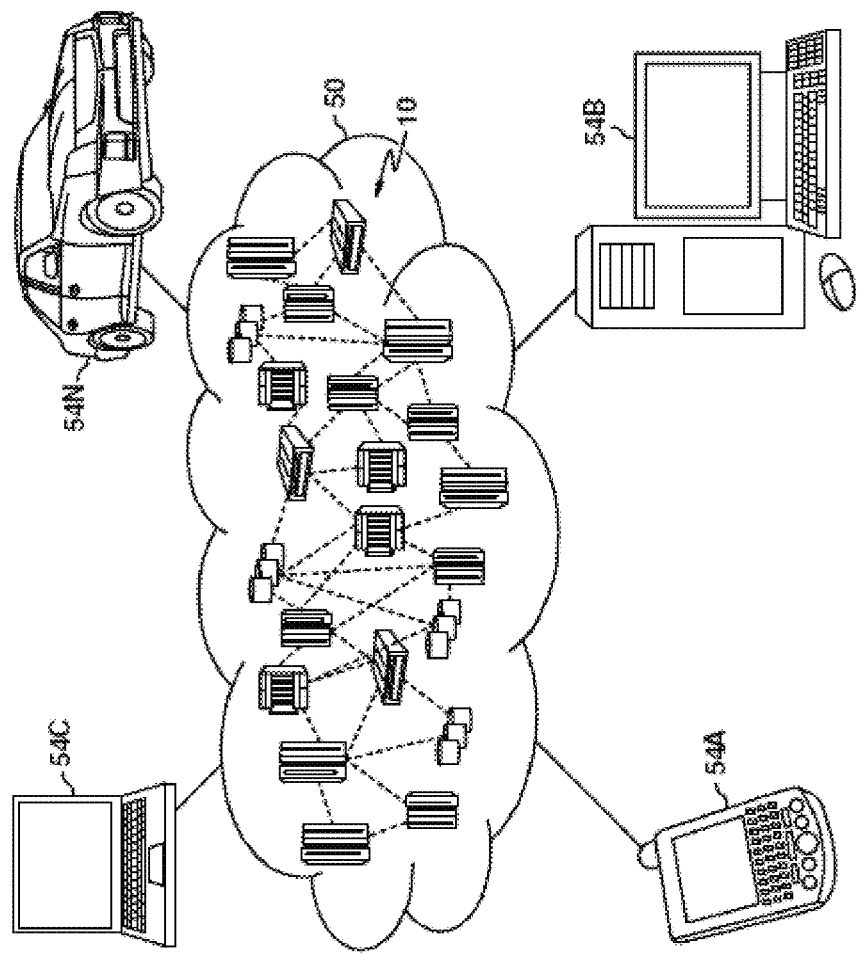
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
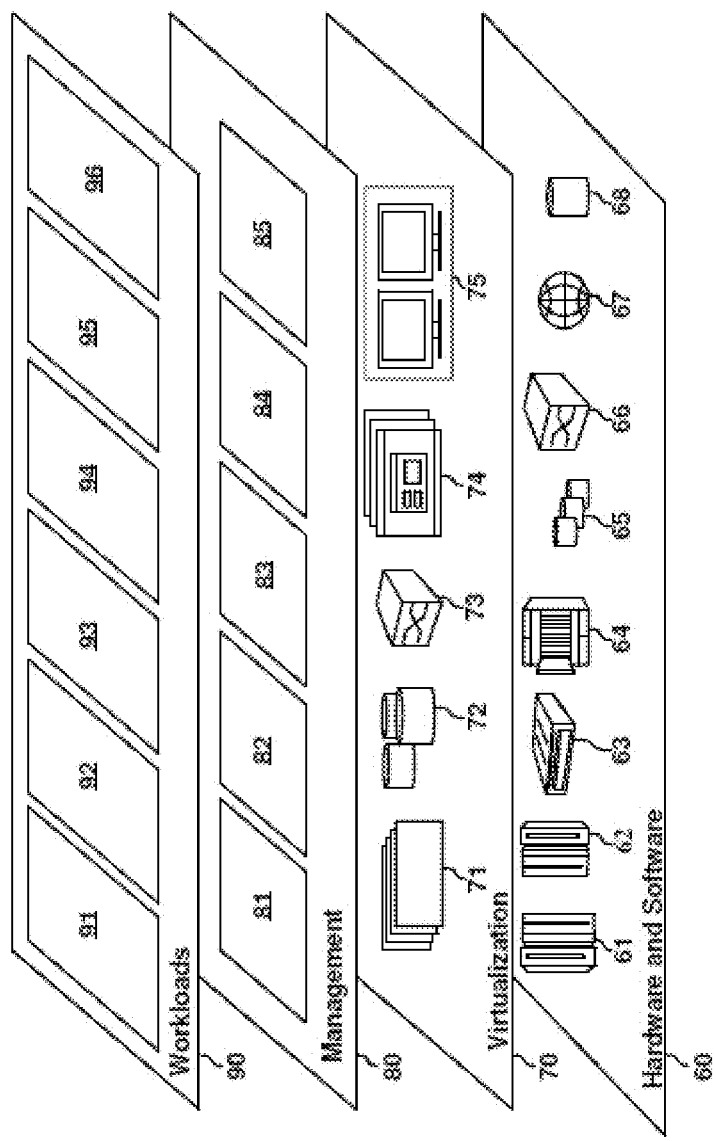
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing video-based authentication 96.

Figure 3:
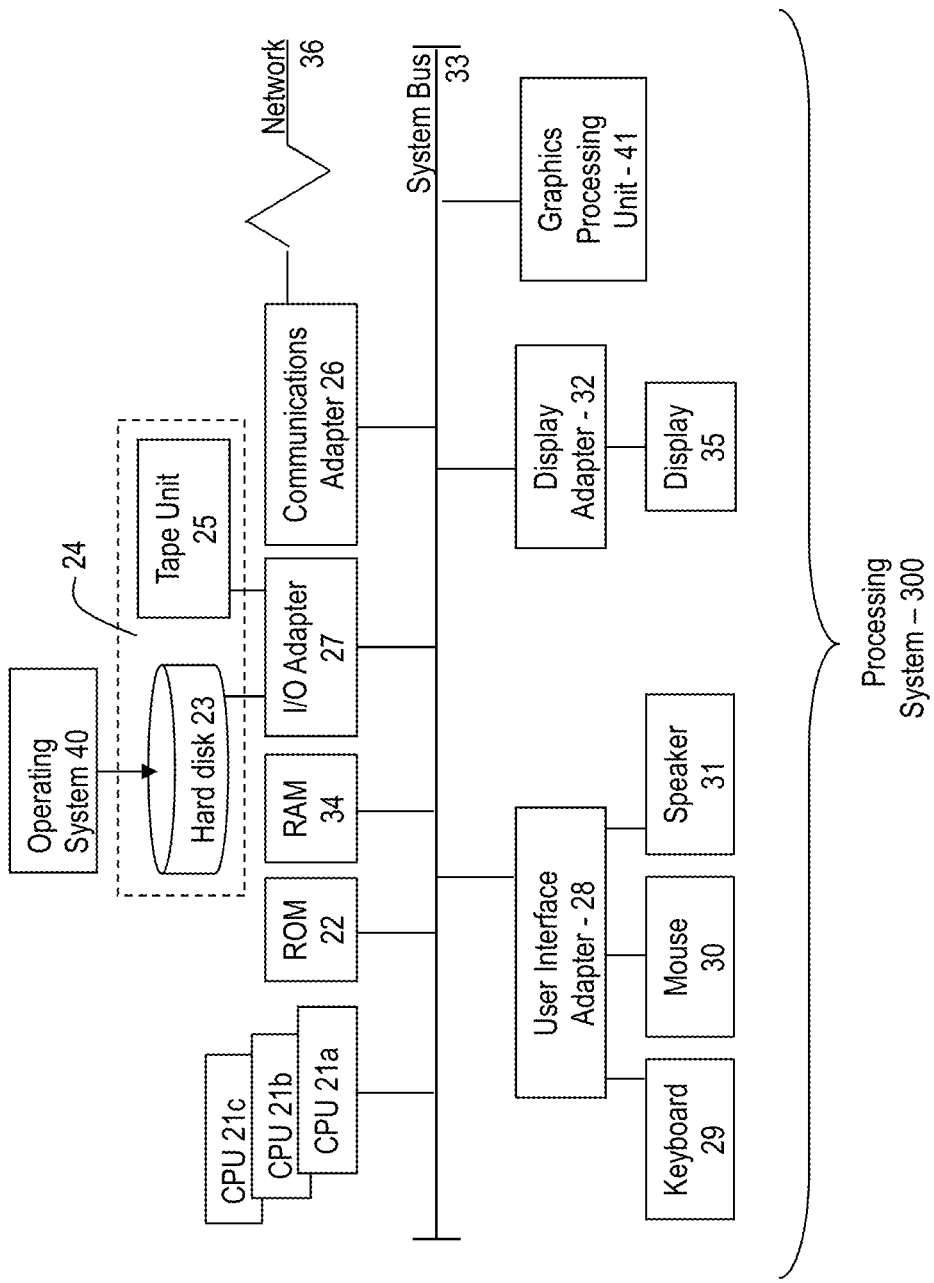
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

Turning now to an overview of technologies that are more specifically relevant to aspects of the present disclosure, techniques for video-based authentication are provided. Some authentication techniques, such as multi-factor authentication, may utilize additional information beyond a user's login credentials to authenticate the identity of the user in order to, for example, grant the user with access to an account. Some authentication techniques may, for example, gather location data from a user to perform a location-based authentication. Other authentication techniques use images to authenticate a user. For example, some authentication techniques present an image or images to a user and require that the user select the correct image, images, order of images, etc., in order to be authenticated. However, none of these existing techniques enable user authentication by enabling a user to provide media (e.g., an image, images, video, etc.) of a plurality of objects that may be personal to a user to satisfy authentication requirements.

Turning now to an overview of the aspects of the invention, one or more embodiments of the invention address the above-described shortcomings of the prior art by providing video-based authentication of a user based on user-provided media. In particular, the present techniques provide system or data access by authenticating the user's identity based on user-provided media that includes objects that are predefined by the user, optionally presented in a predetermined sequence. To configure the system, the user provides a master video including a plurality of objects and then selects a subset of the objects to serve as authentication objects, following identification of the objects by the system. During authentication of the user, the user may then submit an authentication video that includes a second plurality of objects that at least includes the authentication objects. Using a validation algorithm, the system verifies that the media provided by the user includes objects that correspond to the authentication objects. For example, if the authentication objects are a ball, a mouse and a pen, the system may identify the objects in the authentication video and confirm that they include a ball, a mouse and a pen. According to some embodiments, the objects must be presented in the same order as the authentication objects in order for the system to successfully authenticate the user. According to some embodiments, the authentication of the user may fail if the authentication video includes a list of objects that match a previously submitted list. The authentication for granting access to a resource can also include accessing the actual resource by the user or otherwise making the resource available to the user.

This provides a number of advantages. For example, the present techniques provide a highly secure authentication technique by obscuring the identification of the authentication objects within a user-submitted video by intermingling them with non-authentication objects (i.e., other random objects that do not form part of the sequence of authentication objects). These techniques prevent access to non-authorized users. Although the present techniques are discussed above with respect to multi-factor authentication, the present techniques can also be used for individual or sole authentication.

Example embodiments of the disclosure include or yield various technical features, technical effects, and/or improvements to technology. Example embodiments of the disclosure provide an enhanced processing system and data security by using user-submitted video authentication of a user for authentication to restricted resources by receiving media from the user containing images of objects and validating the media received from the user against the previously selected authentication objects to authenticate the user. These aspects of the disclosure constitute technical features that yield the technical effect grating the user access to a restricted resource when it is determined that the user is authenticated. Accordingly, unauthorized access can be reduced, thereby improving computing systems by providing heightened security. As a result of these technical features and technical effects, a system in accordance with example embodiments of the disclosure represents an improvement to existing system and data security techniques. It should be appreciated that the above examples of technical features, technical effects, and improvements to technology of example embodiments of the disclosure are merely illustrative and not exhaustive.

Figure 4:
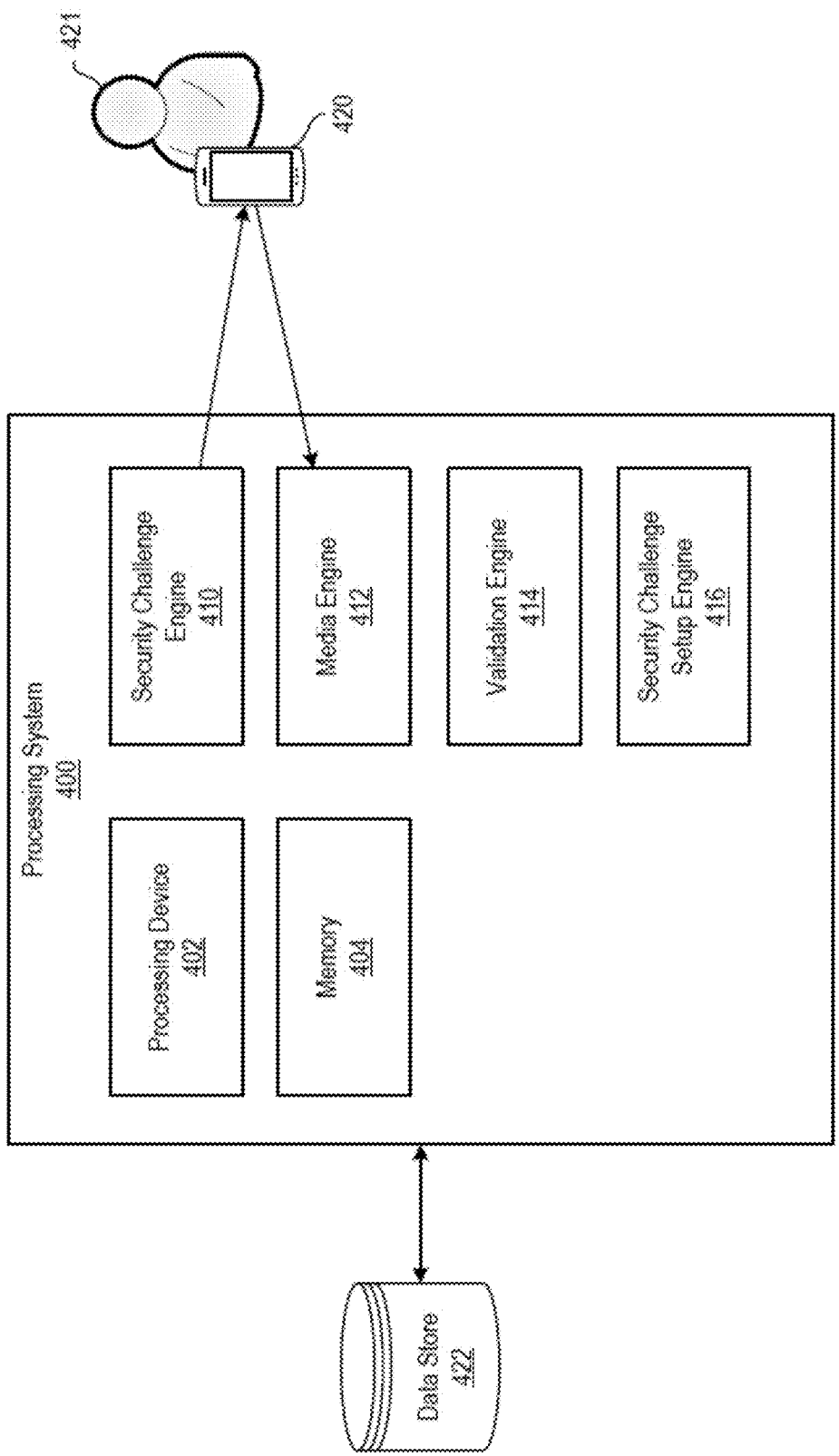
FIG. 4 depicts a system upon which providing video-based authentication may be implemented according to one or more embodiments of the present invention.

FIG. 4 depicts a block diagram of a processing system 400 for providing video authentication of a user, according to aspects of the present disclosure. The various components, modules, engines, etc. described regarding FIG. 4 can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the engine(s) described herein can be a combination of hardware and programming. The programming can be processor executable instructions stored on a tangible memory, and the hardware can include the processing device 402 for executing those instructions. Thus a system memory (e.g., memory 404) can store program instructions that when executed by the processing device 402 implement the engines described herein. Other engines can also be utilized to include other features and functionality described in other examples herein.

The processing system 400 includes the processing device 402, the memory 404, a security challenge engine 410, a media engine 412, and a validation engine 414. The security challenge engine 410 issues a security challenge to a user device 420 associated with a user 421.

The security challenge engine 410 prompts the user to provide media (e.g., a video, etc.) that can be used to authenticate the user 421 and the user device 420 to enable the user to access a restricted resource (e.g., a processing system, data, etc.). For example, upon attempting to log into an account by providing a username and password, the security challenge engine 410 may issue a security challenge to user device 420 requesting that the user provide an authentication video that includes a number of predetermined authentication objects. Failure to provide an appropriate authentication video may prevent user 421 from accessing the restricted resource (e.g., prevent a user from accessing the account).

Figure 5A:
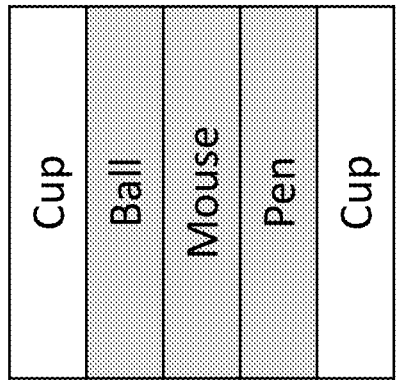
FIG. 5A depicts an example table of a plurality of objects provided in a master video recording according to one or more embodiments of the present invention.
Figure 5B:
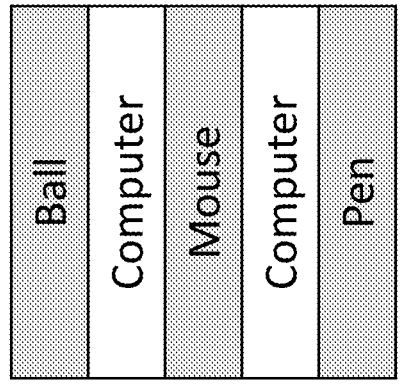
FIG. 5B depicts an example table of a user selection of objects from a plurality of objects according to one or more embodiments of the present invention.
Figure 5C:
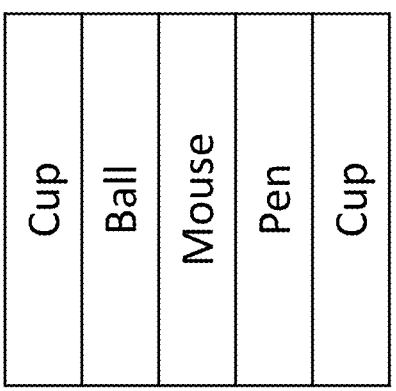
FIG. 5C depicts an example table of authentication objects according to one or more embodiments of the present invention.

According to aspects of the present disclosure, the processing system 400 can also include a security challenge setup engine 416 that enables the user 421 to perform an initial setup of the security challenge. The security challenge can be set up using the security challenge setup engine 416, which enables the user 421 to provide a selection of authentication objects provided in a master video. For instance, the user can provide several pictures and/or videos of a number of objects in the user's residence. For example, as shown in FIG. 5A, the system (e.g., media engine 412) may receive a master video from user device 420 and determine that the master video sequentially shows the following objects: a cup, a ball, a mouse, a pen, and a cup. The user may select a number, and optionally a sequence, of objects from the master list of objects (i.e., the list of objects obtained from the master video) to serve as the authentication objects which will be used by validation engine 414 to authenticate the user 421 based on receipt of future authentication videos. For example, as shown by FIG. 5B, the user may select, in sequence, a ball, a mouse and a pen to serve as the authentication objects. As shown in FIG. 5C, the system may delete the objects that were not selected and the sequence of selected objects may be stored as the authentication objects.

As will be appreciated by those of skill in the art, the media engine 412 may use existing image recognition techniques (e.g., IBM WATSON™ visual recognition) to identify each object presented in the master video or any subsequent authentication video. According to some embodiments, the media engine 412 may identify objects in a video recording by sampling the video at a predetermined rate (e.g., 1 sample per second, 3 samples per second, etc.) to extract a series of static images and applying image recognition techniques to the static images to identify a high-confidence (e.g., greater than 90% confidence level) match to an object shown in the static images. If multiple subsequent static images include the same object, the multiple subsequent static images may be considered to represent one instance of a presentation of the object. According to some embodiments, sampling rates and confidence levels may be selected by an operator of the system. According to some embodiments, once a text-based list of objects is extracted from a video, the list may be stored and the video may be deleted to free up memory. In some embodiments, if a video submitted by a user does not meet the minimum number of identifiable objects, the system (e.g., validation engine 414) may cause a request to be sent to user device 420 to request that another video be provided.

Figure 5D:
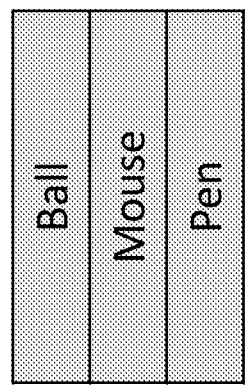
FIG. 5D depicts an example table of objects derived from an authentication video according to one or more embodiments of the present invention.

In response to a security challenge, the user 421 can use the user device 420 (or another suitable device) to capture media, such as a video (i.e., authentication video) of a sequence of particular objects in the user's vicinity and transmit the media to the processing system 400. The authentication video should include recordings of the authentication objects, as well as other non-authentication objects to provide an original video. The use of such original videos can prevent an unauthorized user from attempting to obtain and reuse a previously captured video for authentication. The media engine 412 receives the media from the user device 420 associated with the user 421 and identifies the objects (e.g., using image recognition techniques) shown in the recording. For example, as shown in FIG. 5D, the user may provide an authentication video that shows, in sequence: a ball, a computer, a mouse, a computer and a pen.

The validation engine 414 uses the received media to validate the authentication video against the previously stored authentication objects to determine whether the user 421 shall be authenticated. The validation engine 414 can identify a list of objects included in the authentication video and compare them against a stored list of authentication objects and other lists of objects that were included in previously submitted authentication videos. For example, as shown in FIG. 5D, the validation engine 414 may determine that the list of objects shown in a user-submitted authentication video may include a ball, a mouse and a pen, which matches all of the previously stored authentication objects shown in FIG. 5C, and the objects are presented in the same sequence as that of the stored authentication objects. The sequence of authentication objects presented in the authentication video may ignore the non-authentication objects (e.g., the computer in FIG. 5D). The media previously provided by the user (e.g., the master video or previously submitted authentication videos), a list of objects derived from the master video and/or authentication videos, and the list of authentication objects can be stored in any suitable repository, such as the data store 422, which can be integrated into the processing system 400 and/or accessible by the processing system 400, such as over a network.

According to aspects of the present disclosure, if the validation engine 414 determines that a list of objects depicted in a user-submitted authentication video includes objects that match a stored list of authentication objects, then the security challenge engine 410 may authenticate the user and provide the user with access to a protected resource (e.g., access to a password protected account, etc.). According to some embodiments, for the authentication to be successful, the validation engine 414 may need to determine that the authentication video includes objects that match a stored of authentication objects in the same sequence as the stored list of authentication objects.

As shown in FIG. 5E, the validation engine 414 may determine that an authentication video is valid, and therefore the user is authenticated, in many successive authentication videos that can be provided in response to a security challenge based on different attempts by a user to access a protected resource over time. As shown in FIG. 5F, according to some embodiments, the validation engine 414 may determine that a user-submitted authentication video is not valid, and therefore the user is not authenticated, in response to determining that the authentication video includes a list of objects that match a list of objects submitted in a previously submitted authentication video (or within a number of the most recent previously submitted authentication videos) (e.g., Login #6), does not include all of the authentication objects (e.g., Login #7), presents the authentication objects in a sequence that does not match the stored sequence of authentication objects (e.g., Login #8), does not include one or more additional objects (i.e., non-authentication objects) (e.g., Login #9), or if the authentication video includes a previously identified security object. A security object may be an object that a user has previously selected that if present in an authentication video, can trigger an automatic rejection of the authentication attempt. According to some embodiments, the validation engine 414 may also count the number of static images (i.e., frames) of each object in an authentication video and compare them with a stored number of frames corresponding to each object identified from the master video and/or previously submitted authentication videos to determine that the currently submitted video (or portions of the video) is not a duplicate.

Figure 6:
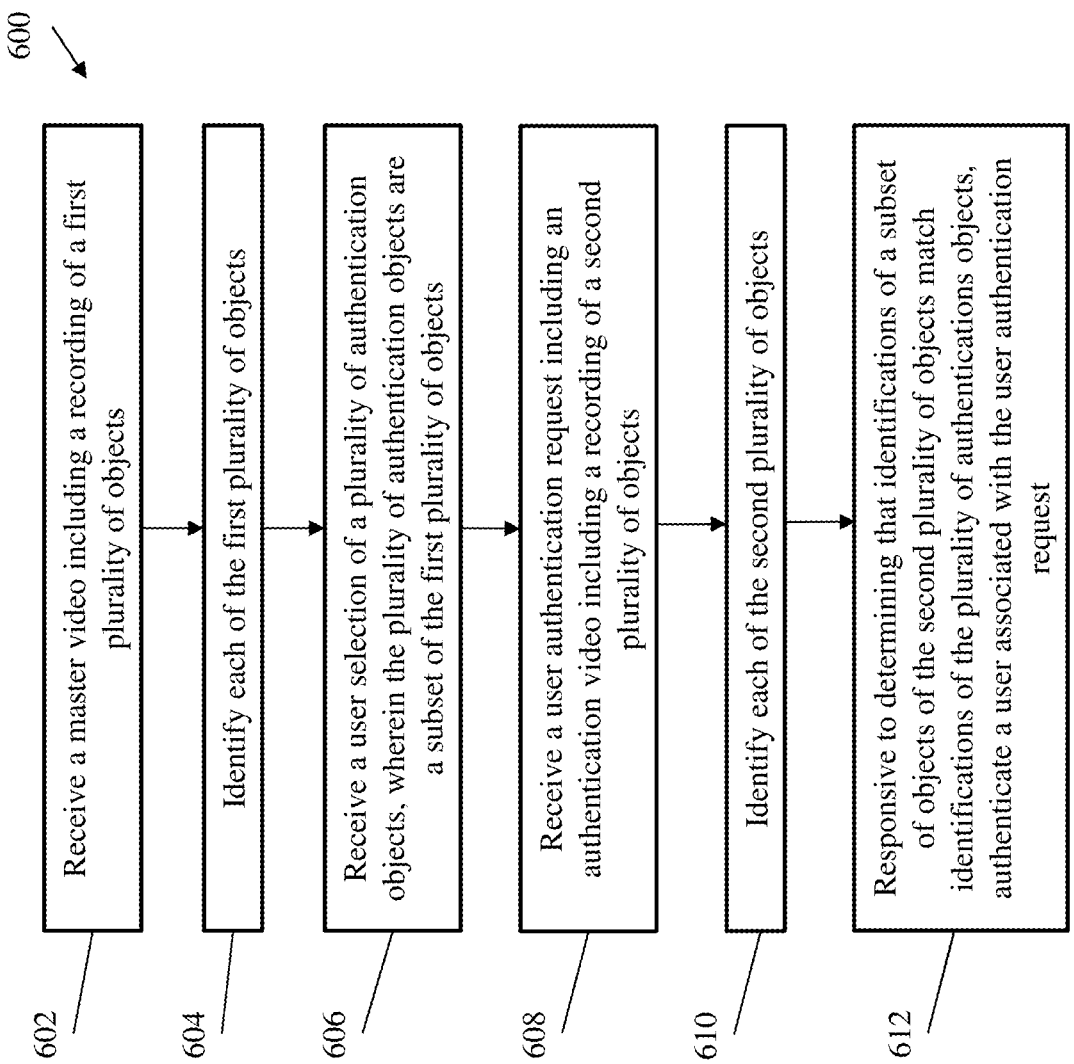
FIG. 6 depicts a flow diagram of a method for providing video-based authentication according to one or more embodiments of the invention.

Turning now to FIG. 6, a flow diagram of a method 600 for providing video-based authentication in accordance with an embodiment is shown. In one or more embodiments of the present invention, the method 600 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 600 begins at block 602 and includes receiving (e.g., via processing system 400) a master video comprising a recording of a first plurality of objects. According to some embodiments, a master video may be a video recording obtained and submitted by a user (e.g., via user device 420). For example, a user may record a plurality of objects contained in an office or other room occupied by the user.

As shown at block 604, the method includes identifying (e.g., via processing system 400) each of the first plurality of objects. As previously described above, objects may be identified by the system (e.g., via media engine 412) using image recognition techniques. In some embodiments, identifying each of the first plurality of objects may include sampling the master video at a predetermined rate to extract a series of static images and applying image recognition techniques to the static images to identify a high-confidence match to an object shown in the static images. The identified objects may be stored a text-based list of objects. The sequence of objects as they appear in the master video may also be stored in association with the list of objects.

As shown at block 606, the method includes receiving (e.g., via processing system 400) a user selection of a plurality of authentication objects, where the plurality of authentication objects is a subset of the first plurality of objects. For example, in some embodiments, user device 420 may include a software application that is configured to interact with processing system 400 to allow a user to present the stored list of objects included in the master video to the user and allow the user to select a subset of the objects to serve as the authentication objects.

As shown at block 608, the method includes receiving (e.g., via processing system 400) a user authentication request comprising an authentication video. The authentication video may include a recording of a second plurality of objects. In some embodiments, the user authentication request may include primary user authentication mechanism, such as a username and password associated with an account of the user associated with the user authentication request. Other primary user authentication mechanisms may include a fingerprint scan, a biometric signal or any other such primary factor that may be associated with a user. According to some embodiments, the user authentication request may be provided in response to a security challenge received by user device 420 from processing system 400. In some embodiments, the processing system 400 may issue a security challenge to user device 420 in response to receiving login credentials (e.g., username and password) from user device 420 in association with a login attempt. Thus, in some embodiments, the username and password may be provided prior to the authentication video.

As shown at block 610, the method includes identifying (e.g., via processing system 400) each of the second plurality of objects. As previously described above, image recognition techniques may be used by processing system 400 to generate a text-based list of each object shown in the authentication video.

As shown at block 612, the method includes authenticating (e.g., via processing system 400) a user associated with the user authentication request. According to some embodiments, the authentication may be performed in response to determining that identifications of a subset of objects of the second plurality of objects match identifications of the plurality of authentication objects. In some embodiments, authenticating the user associated with the user authentication request may include allowing the user to log into a user account. In some embodiments, authenticating the user may include determining that the second plurality of objects does not match the first plurality of objects or a stored list of objects identified from a previously submitted authentication video or a predetermined number of previously submitted videos. For example, the processing system 400 may compare the items present in the currently presented authentication video to the lists of items contained in the last 10 previously submitted authentication videos to determine that the current list does not match any of the lists of items associated with those videos. In this way, the system can prevent a user or an imposter from submitting the same or similar videos, but rather may require the user to provide a degree of variety in the objects and/or sequences of objects presented in an authentication video. As the selection of objects will be very unique to the user 421, this greatly reduces the probability that an unauthorized user may correctly guess an appropriate list/sequence of items to record in order to achieve authentication.

According to some embodiments, receiving a user selection of a plurality of authentication objects may include receiving a selection of an authentication sequence of the plurality of authentication objects and authenticating the user may include determining that the subset of objects of the second plurality of objects appear within the authentication video in a sequence that matches the authentication sequence. Thus, in some embodiments, the validation engine 414 may consider the sequence of both the stored authentication items as well as the sequence of items presented in an authentication video to determine whether the sequences match. When considering the sequence of authentication objects presented in an authentication video, the processing system 400 may ignore the non-authentication objects, however, the sequence of all objects may be considered when determining whether the objects included in an authentication video match a previous list of objects presented in a previously submitted authentication video.

According to some embodiments, the master video and the authentication video may be obtained by the user 421 (e.g., via user device 420) associated with the user authentication request by recording objects in the user's environment. For example, a user 421 may use a video recording functionality of a smartphone to create a video recording of objects in the user's vicinity.

In some embodiments, the master video may include a recording of at least a predetermined threshold length of time and the first plurality of objects may include at least a predetermined threshold number of objects. For example, in some embodiments, the master video must be of at least 20 seconds in duration and include at least 5 objects. It will be understood that this is merely an example and any predetermined threshold length of time or number of objects may be used. According to some embodiments, the predetermined threshold number of objects may allow for repeated use of the same object, provided that one or more other objects are interspersed between the repeated uses of the same object.

According to some embodiments, the method 600 may further include transmitting a notification requesting the user to submit another authentication video in response to determining that the authentication video is shorter than a predetermined duration of time or the second plurality of objects is less than a predetermined number of objects.

In some embodiments, the method 600 may further include storing a list corresponding to the second plurality of objects. The stored list of objects may then be used by processing system 400 in future authentications by comparing a list of items included in a future authentication video to the stored list to determine whether there is a match. As previously described above, in some embodiments, if the list of objects included in an authentication video matches that of a previously submitted authentication video, the processing system 400 may reject the authentication of the user and prevent the user from accessing the protected resources.

In some embodiments, the method 600 may further include receiving a user selection of a security object and responsive to determining that the recording of the second plurality of objects includes the security object (e.g., using image recognition techniques), denying authentication of the user associated with the user authentication request. According to some embodiments, a user may provide a selection of a security object by for example, selecting an object in the master video or another video provided by the user, which has been identified by the system (e.g., using image recognition techniques). Alternatively, a user may select one or more objects from a list of objects provided by the system or input text sufficient to identify an objects selected as a security object.

Figure 7:
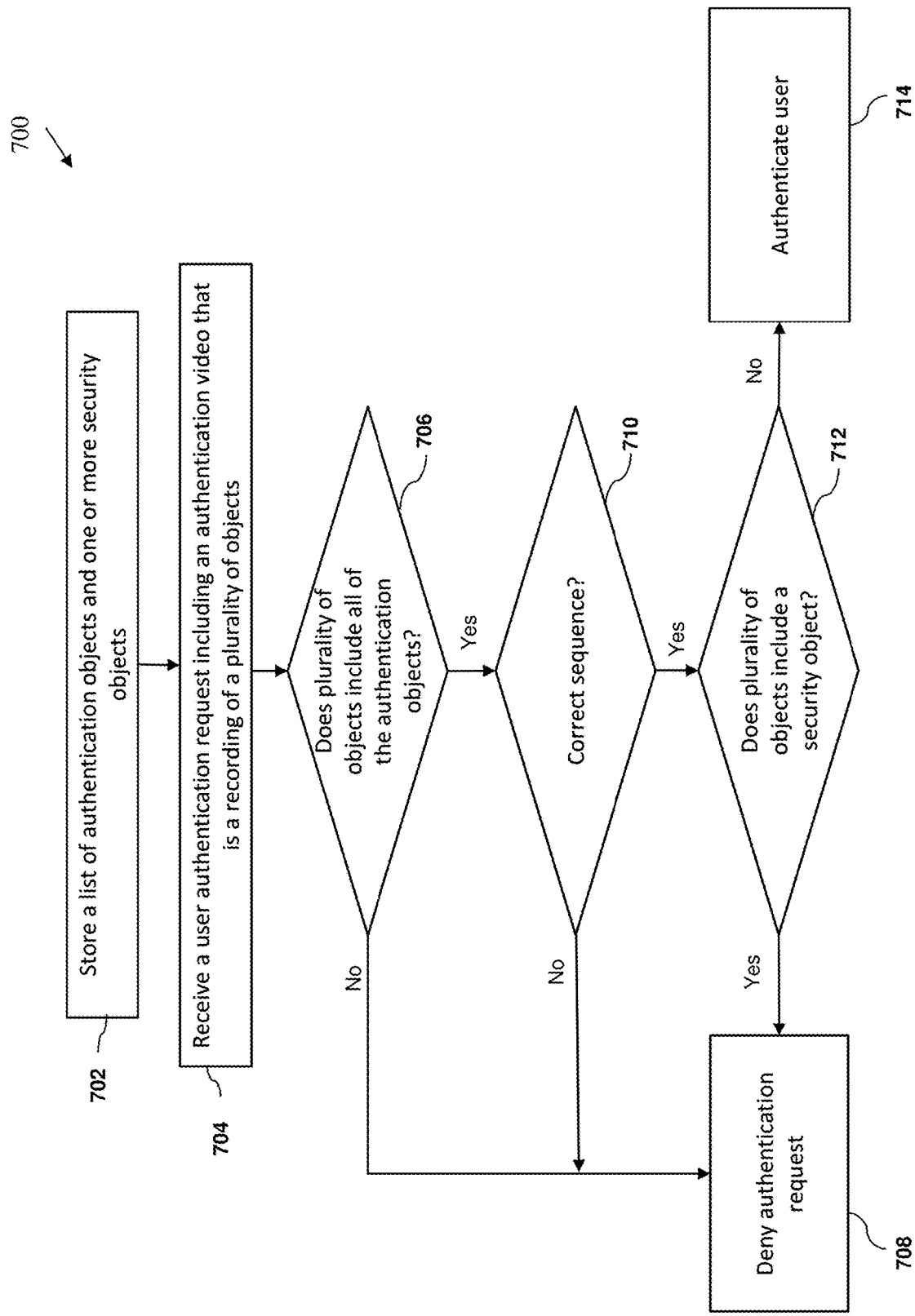
FIG. 7 depicts a flow diagram of another method for providing video-based authentication according to one or more embodiments of the invention.

FIG. 7 depicts a flow diagram of a method for another method for providing video-based authentication according to one or more embodiments of the invention. In one or more embodiments of the present invention, the method 700 may be embodied in software that is executed by computer elements located within a network that may reside in the cloud, such as the cloud computing environment 50 described herein above and illustrated in FIGS. 1 and 2. In other embodiments, the computer elements may reside on a computer system or processing system, such as the processing system 300 described herein above and illustrated in FIG. 3, or in some other type of computing or processing environment.

The method 700 begins at block 702 and includes storing (e.g., via processing system 400) a list of authentication objects and one or more security objects. As described previously with respect to block 606, the system may receive a user selection of objects to serve of authentication objects. According to some embodiments, a user may select an object provided for example in a master video, to serve as a security object. A security object may be an object that can be used to automatically deny an authentication attempt in response to the system determining that the security object is present in an authentication video provided by a user. Thus, for example, if the user 421 is being forced by another to attempt to access a secured resource under duress, the user 421 may prevent access to the secured resource by recording the security object as part of the authentication video provided by the user.

As shown in block 704, the method 700 includes receiving (e.g., via processing system 400) a user authentication request including an authentication video. As described above, the authentication video may be a recording of a plurality of objects that can be identified by the processing system 400, using for example, image recognition techniques. As shown in block 706, the method 700 includes determining (e.g., via processing system 400) whether the plurality of objects included in the authentication video includes all of the stored authentication objects. If the processing system 400 determines that the authentication video does not include all of the stored authentication objects, the method may proceed to block 708 where the processing system 400 may deny the authentication request, thereby preventing the user from accessing a secured resource. If at block 706, the processing system determines that the authentication video does include all of the authentication items, then the method proceeds to block 710 where the system determines if the authentication objects included in the authentication video are presented in the same sequence as the stored authentication objects. If not, the method proceeds to block 708 where authentication is denied. However, if the sequences are determined to match, the method proceeds to block 712 where the system determines whether the plurality of objects contained in the authentication video includes a security object. For example, if the user 421 previously designed a "speaker" as being a security object and the processing system 400 determines that the authentication video includes images of a speaker, then the method will proceed to block 708 where authentication is denied. However, if the processing system 400 determines that the list of objects identified as being represented by the authentication video does not include the security object, then the method proceeds to block 714 where the processing system 400 authenticates the user and grants access to a secured resource (e.g., allows the user to log into a website account).

Additional processes may also be included. It should be understood that the processes depicted in FIGS. 6 and 7 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
receiving a master video comprising a recording of a first plurality of objects;
identifying, using image recognition techniques, each of the first plurality of objects;
receiving a user selection of a plurality of authentication objects, wherein the plurality of authentication objects comprise at least a subset of the first plurality of objects;
receiving a user authentication request comprising an authentication video, the authentication video comprising a recording of a second plurality of objects;

identifying, using image recognition techniques, each of the second plurality of objects;

responsive to determining that identifications of a proper subset of objects of the second plurality of objects match identifications of the plurality of authentication objects, authenticating a user associated with the user authentication request.

2. The computer-implemented method of claim 1, wherein receiving a user selection of a plurality of authentication objects comprises receiving a selection of an authentication sequence of the plurality of authentication objects and authenticating the user comprises determining that the subset of objects of the second plurality of objects appear within the authentication video in a sequence that matches the authentication sequence.

3. The computer-implemented method of claim 1, further comprising:

receiving a user selection of a security object; and responsive to determining that the recording of the second plurality of objects includes an image of the security object, denying authentication of the user associated with the user authentication request.

4. The computer-implemented method of claim 1, wherein authenticating the user associated with the user authentication request comprises allowing the user to log into a user account.

5. The computer-implemented method of claim 1, wherein identifying each of the first plurality of objects comprises:

sampling the master video at a predetermined rate to extract a series of static images; and applying image recognition techniques to the static images to identify a high-confidence match to an object shown in the static images.

6. The computer-implemented method of claim 1, wherein the master video and the authentication video are obtained by the user associated with the user authentication request by recording objects in the user's environment.

7. The computer-implemented method of claim 1, wherein the master video comprises a recording of at least a predetermined threshold length of time and the first plurality of objects comprises at least a predetermined threshold number of objects.

8. The computer-implemented method of claim 1, further comprising:

responsive to determining that the authentication video is shorter than a predetermined duration of time or the second plurality of objects is less than a predetermined number of objects, transmitting a notification requesting the user to submit another authentication video.

9. The computer-implemented method of claim 1, wherein authenticating the user comprises determining that the second plurality of objects does not match the first plurality of objects or a stored list of objects identified from a previously submitted authentication video.

10. The computer-implemented method of claim 1, further comprising:

storing a list corresponding to the second plurality of objects.

11. A system comprising:

a processor communicatively coupled to a memory, the processor configured to:

receive a master video comprising a recording of a first plurality of objects;

identify, using image recognition techniques, each of the first plurality of objects;

receive a user selection of a plurality of authentication objects, wherein the plurality of authentication objects comprise at least a subset of the first plurality of objects;

receive a user authentication request comprising an authentication video, the authentication video comprising a recording of a second plurality of objects;

identify, using image recognition techniques, each of the second plurality of objects;

responsive to determining that identifications of a proper subset of objects of the second plurality of objects match identifications of the plurality of authentication objects, authenticate a user associated with the user authentication request.

12. The system of claim 11, wherein receiving a user selection of a plurality of authentication objects comprises receiving a selection of an authentication sequence of the plurality of authentication objects and authenticating the user comprises determining that the subset of objects of the second plurality of objects appear within the authentication video in a sequence that matches the authentication sequence.

13. The system of claim 11, wherein the processor is further configured to:

receive a user selection of a security object; and responsive to determining that the recording of the second plurality of objects includes an image of the security object, deny authentication of the user associated with the user authentication request.

14. The system of claim 11, wherein authenticating the user associated with the user authentication request comprises allowing the user to log into a user account.

15. The system of claim 11, wherein identifying each of the first plurality of objects comprises:

sampling the master video at a predetermined rate to extract a series of static images; and applying image recognition techniques to the static images to identify a high-confidence match to an object shown in the static images.

16. The system of claim 11, wherein the master video and the authentication video are obtained by the user associated with the user authentication request by recording objects in the user's environment.

17. A computer program product comprising a computer readable storage medium having program instructions embodied therewith the program instructions executable by a computer processor to cause the computer processor to perform a method comprising:

receiving a master video comprising a recording of a first plurality of objects;

identifying, using image recognition techniques, each of the first plurality of objects;

receiving a user selection of a plurality of authentication objects, wherein the plurality of authentication objects comprise at least a subset of the first plurality of objects;

receiving a user authentication request comprising an authentication video, the authentication video comprising a recording of a second plurality of objects;

identifying, using image recognition techniques, each of the second plurality of objects;

responsive to determining that identifications of a proper subset of objects of the second plurality of objects match identifications of the plurality of authentication objects, authenticating a user associated with the user authentication request.

18. The computer program product of claim 17, wherein receiving a user selection of a plurality of authentication objects comprises receiving a selection of an authentication sequence of the plurality of authentication objects and authenticating the user comprises determining that the subset of objects of the second plurality of objects appear within the authentication video in a sequence that matches the authentication sequence.

19. The computer program product of claim 17, wherein the method further comprises:
- receiving a user selection of a security object; and
- responsive to determining that the recording of the second plurality of objects includes an image of the security object, denying authentication of the user associated with the user authentication request.

20. The computer program product of claim 17, authenticating the user associated with the user authentication request comprises allowing the user to log into a user account.

* * * * *